US006362827B1

(12) United States Patent
Ohba

(10) Patent No.: US 6,362,827 B1
(45) **Date of Patent: *Mar. 26, 2002**

(54) APPARATUS AND METHOD FOR DISPLAYING A PLURALITY OF GENERATED VIDEO IMAGES AND EXTERNALLY SUPPLIED IMAGE DATA

(75) Inventor: Akio Ohba, Kanagawa (JP)

(73) Assignee: Sony Computer Entertainment Inc., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/930,678

(22) PCT Filed: Feb. 6, 1997

(86) PCT No.: PCT/JP97/00298

§ 371 Date: Dec. 29, 1997

§ 102(e) Date: Dec. 29, 1997

(87) PCT Pub. No.: WO97/29476

PCT Pub. Date: Aug. 14, 1997

(30) Foreign Application Priority Data

Feb. 6, 1996 (JP) ............................................ 8-020333

(51) Int. Cl.[7] ................................................ G06F 15/76

(52) U.S. Cl. ....................... 345/572; 345/531; 345/537; 345/546; 345/560; 348/718

(58) Field of Search ......................... 345/112–116, 118, 345/127–132, 501–503, 520, 526, 507, 509, 515, 196, 516, 508, 511, 203, 531, 533, 534, 537, 546, 557, 560, 572; 348/511, 521–524, 552, 555, 556, 558, 563, 564, 584, 586, 588, 589, 714–721

(56) References Cited

U.S. PATENT DOCUMENTS

| | | | | | |
|---|---|---|---|---|---|
| 5,065,343 | A | | 11/1991 | Inoue | 345/512 |
| 5,070,323 | A | | 12/1991 | Iino et al. | 345/7 |
| 5,097,257 | A | * | 3/1992 | Clough et al. | 345/132 |
| 5,463,419 | A | * | 10/1995 | Saito | 348/233 |
| 5,473,342 | A | * | 12/1995 | Tse et al. | 345/132 |
| 5,526,025 | A | * | 6/1996 | Selwan et al. | 345/516 |
| 5,608,864 | A | * | 3/1997 | Bimdlish et al. | 345/507 |
| 5,611,041 | A | * | 3/1997 | Bril et al. | 345/507 |
| 5,691,768 | A | * | 11/1997 | Civanlar et al. | 348/392 |
| 5,745,095 | A | * | 4/1998 | Parchem et al. | 345/114 |
| 5,754,242 | A | * | 5/1998 | Ohkami | 348/441 |
| 5,805,148 | A | * | 9/1998 | Swamy et al. | 345/509 |
| 5,920,327 | A | * | 7/1999 | Seidensticker, Jr. | 345/523 |
| 6,014,126 | A | * | 1/2000 | Nishihara | 345/132 |
| 6,091,430 | A | * | 7/2000 | Bodin et al. | 345/510 |

FOREIGN PATENT DOCUMENTS

| | | | |
|---|---|---|---|
| DE | 39 08507 | A1 | 10/1989 |
| GB | 2 217 1555 | A | 10/1989 |
| GB | 2 248 158 | A | 3/1992 |
| JP | 59-222884 | | 12/1984 |
| JP | 01-251094 | | 10/1989 |
| JP | 2-114293 | | 4/1990 |
| JP | 2-114294 | | 4/1990 |
| JP | 2-114295 | | 4/1990 |

* cited by examiner

*Primary Examiner*—Ulka J. Chauhan
(74) *Attorney, Agent, or Firm*—Fulwider Patton Lee & Utecht, LLP

(57) ABSTRACT

Picture data read out from a VRAM 18 are sent via line buffers 75*a* to 75*d* to a selection synthesis unit 63. The line buffer 75*d* receives picture data supplied from outside for sending the received picture data to the VRAM 18. The VRAM 18 can write the picture data from outside supplied via the line buffer 75*d* and read out the picture data based on addresses from a controller in the same way as other picture data. On the other hand, cache memories 74*a* and 74*b* can read out picture data under control by the controller 71 to display plural pictures in a tiled pattern on a display screen.

7 Claims, 11 Drawing Sheets

APPARATUS AND METHOD FOR DISPLAYING A PLURALITY OF GENERATED VIDEO IMAGES AND EXTERNALLY SUPPLIED IMAGE DATA

BACKGROUND OF THE INVENTION

1. Field of the Invention

This invention relates to an address generating apparatus, a picture display apparatus, an address generating method and a picture displaying method used in a graphics computer, a special effect device or a video game machine which are picture equipments employing a computer.

2. Related Art

In a picture display apparatus having a picture memory, such as a personal computer or a television game machine, data written in the picture memory is read out in accordance with synchronization signals of, for example, the NTSC (National Television System Committee) system.

Such picture display apparatus includes a cathode ray tube controller (CRTC) 302 for generating pre-set addresses based on synchronization signals generated by a synchronization signal generating circuit 301, a VRAM 303 for reading out one-frame picture data based on addresses designated by the CRTC 302 and a D/A converter 305 for converting frame data supplied via a line buffer 304 into analog data, as shown for example in FIG. 1.

The CRTC 302 includes a horizontal synchronization counter 311 for counting horizontal synchronization signals, a horizontal resolution reducing circuit 312 for lowering the horizontal resolution to a pre-set value in case of necessity, a horizontal slicing circuit 313 for starting slicing horizontal scanning lines, and a summation circuit 314 for summing data from the horizontal resolution reducing circuit 312 and the horizontal slicing circuit 313.

In addition, the CRTC 302 includes a vertical synchronization counter 316 for counting the vertical synchronization signals, a vertical resolution reducing circuit 317 for lowering the vertical resolution to a pre-set value in case of necessity, a vertical slicing circuit 318 for starting slicing vertical scanning lines, a summation circuit 319 for summing data from the vertical resolution reducing circuit 317 and the vertical slicing circuit 318 and an address generating circuit 320 for generating addresses based on the horizontal synchronization signals and the vertical horizontal synchronization signals supplied thereto.

In the above-described picture display apparatus, the synchronization signal generating circuit 301 generates the horizontal synchronization signals and the vertical horizontal synchronization signals which are sent to the CRTC 302.

In the CRTC 302, the horizontal synchronization counter 311 counts the horizontal synchronization signals supplied from the synchronization signal generating circuit 301.

The horizontal resolution reducing circuit 312 reduces the number of the horizontal synchronization signals, if necessary, for lowering the horizontal resolution of picture data read out from the VRAM 303.

When a pre-set timing is reached by the counting of the horizontal synchronization signals by the horizontal synchronization counter 311, the horizontal slicing circuit 313 generates horizontal slicing data for slicing at a pre-set position of the horizontal scanning line and transmits the horizontal slicing data to the summation circuit 314.

The summation circuit 314 superimposes the horizontal slicing data on the supplied horizontal synchronization signals and transmits the superimposed data to the address generating circuit 320.

On the other hand, the vertical resolution reducing circuit 316 counts the vertical synchronization signals from the synchronization signal generating circuit 301.

The vertical resolution reducing circuit 317 reduces the number of the vertical synchronization signals, if need be, for lowering the vertical resolution of picture data read out from the VRAM 303.

When a pre-set timing is reached by the counting of the vertical synchronization signals by the vertical synchronization counter 318, the vertical slicing circuit 318 generates vertical slicing data for slicing at a pre-set position of the vertical scanning line and transmits the vertical slicing data to the summation circuit 314.

The summation circuit 319 superimposes the vertical slicing data on the supplied horizontal synchronization signals and transmits the superimposed data to the address generating circuit 320.

The address generating circuit 320 generates addresses associated with the superimposed data supplied thereto and transmits the resulting addresses to the VRAM 303.

The VRAM 303 sends the picture data associated with the supplied addresses via line buffer 304 to the D/A converter 305.

The D/A converter 305 converts the supplied picture data into analog data for outputting video signals.

Thus, the picture data written in the VRAM 303 is directly displayed via CRTC 302 on a display screen.

However, if frame data including plural pictures are written in the VRAM 303, it has not been possible with the CRTC 302 employed in the above-described picture display apparatus to slice the plural pictures to display the sliced pictures at a desired location on a sole screen.

Moreover, it has not been possible with the CRTC 302 to receive plural picture data supplied from outside to display the received picture data on the screen.

In view of the above-depicted status of the art, it is an object of the present invention to provide an address generating apparatus, a picture display apparatus, an address generating method and a picture display method, whereby plural pictures can be displayed at plural locations on a sole screen and whereby a picture supplied externally can also be received and displayed thereon.

SUMMARY OF THE INVENTION

An address generating apparatus according to the present invention includes address generating means for generating addresses for reading out picture signals written in a picture memory based on synchronization signals, a plurality of buffers respectively supplied with picture signals read out from the picture memory based on the addresses and controlling means for independently controlling the picture signals outputted by the buffers so that the picture signals supplied to the buffers will be displayed on a sole screen.

In the address generating apparatus according to the present invention, at least one of the buffers preferably receives picture signals supplied from external data to route the recieved picture signals to the picture memory.

A picture displaying apparatus according to the present invention includes address producing means having address generating means for generating addresses for reading out picture signals written in a picture memory based on synchronization signals, a plurality of buffers respectively supplied with picture signals read out from the picture memory based on the addresses, and controlling means for independently controlling the picture signals outputted by the buffers so that the picture signals supplied to the buffers will be displayed on a sole screen, and synthesizing means for synthesizing picture signals outputted by the buffers.

In the picture displaying apparatus according to the present invention, preferably at least one of the buffers receives picture signals supplied from external data to route the received picture signals to the picture memory.

In the picture displaying apparatus according to the present invention, preferably the synthesizing means is program-controlled based on pre-set calculations by the control means.

The picture displaying apparatus according to the present invention preferably includes one or more cache memories fed with picture signals read out from the picture memory for writing supplied picture signals. The control means sequentially read-out controls the picture signals written in the cache memory for causing a plurality of pictures of the same sort to be displayed on a sole screen.

In the picture displaying apparatus according to the present invention, the buffer preferably is made up of a line memory.

An address generating method according to the present invention includes generating addresses for reading out picture signals written in a picture memory based on synchronization signals, supplying picture signals read out from the picture memory based on the addresses to the buffers, and independently controlling the picture signals outputted by the buffers so that the picture signals supplied to the buffers will be displayed on a sole screen.

A picture displaying method according to the present invention includes generating addresses for reading out picture signals written in a picture memory based on synchronization signals, supplying picture signals read out from the picture memory based on the addresses to the buffers, independently controlling the picture signals outputted by the buffers so that the picture signals supplied to the buffers will be displayed on a sole screen, and synthesizing the picture signals outputted by the buffers for display.

DETAILED DESCRIPTION OF THE PREFERRED EMBODIMENTS

Figure 1:
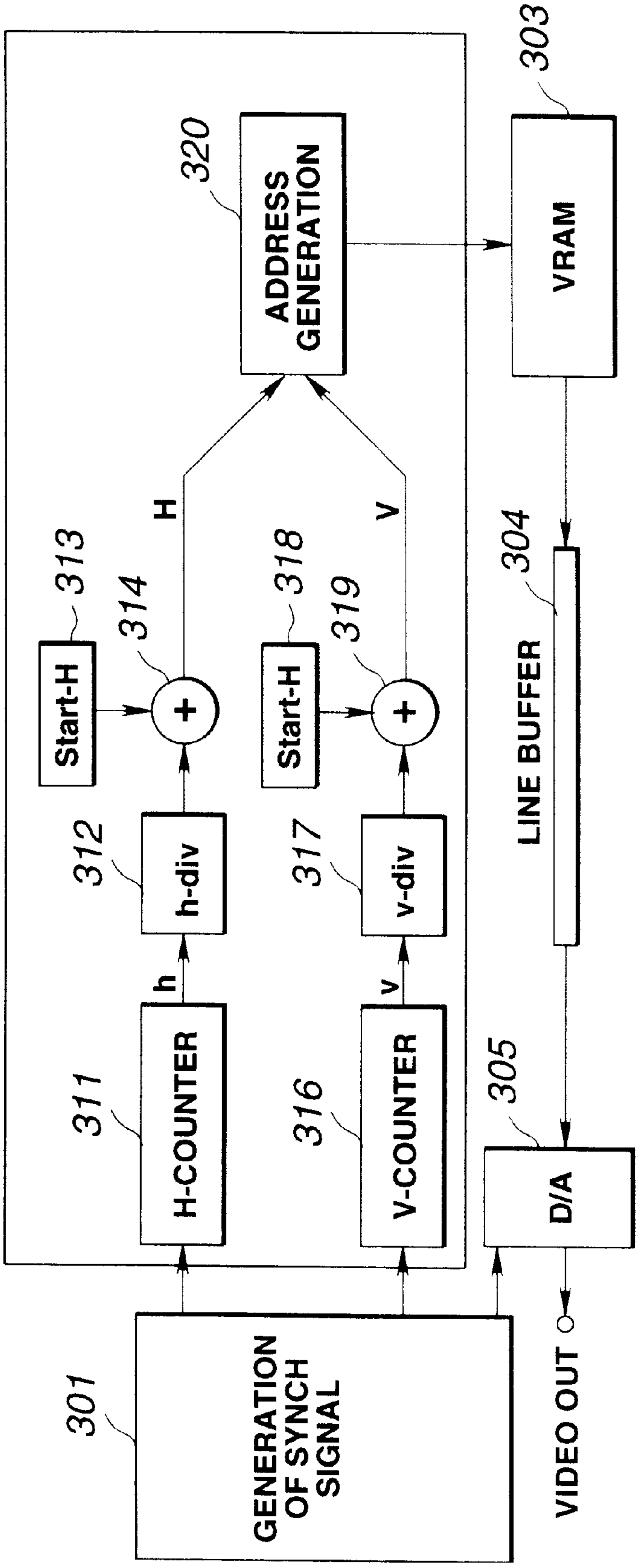
FIG. 1 is a block diagram for illustrating a conventional CRTC.
Figure 2:
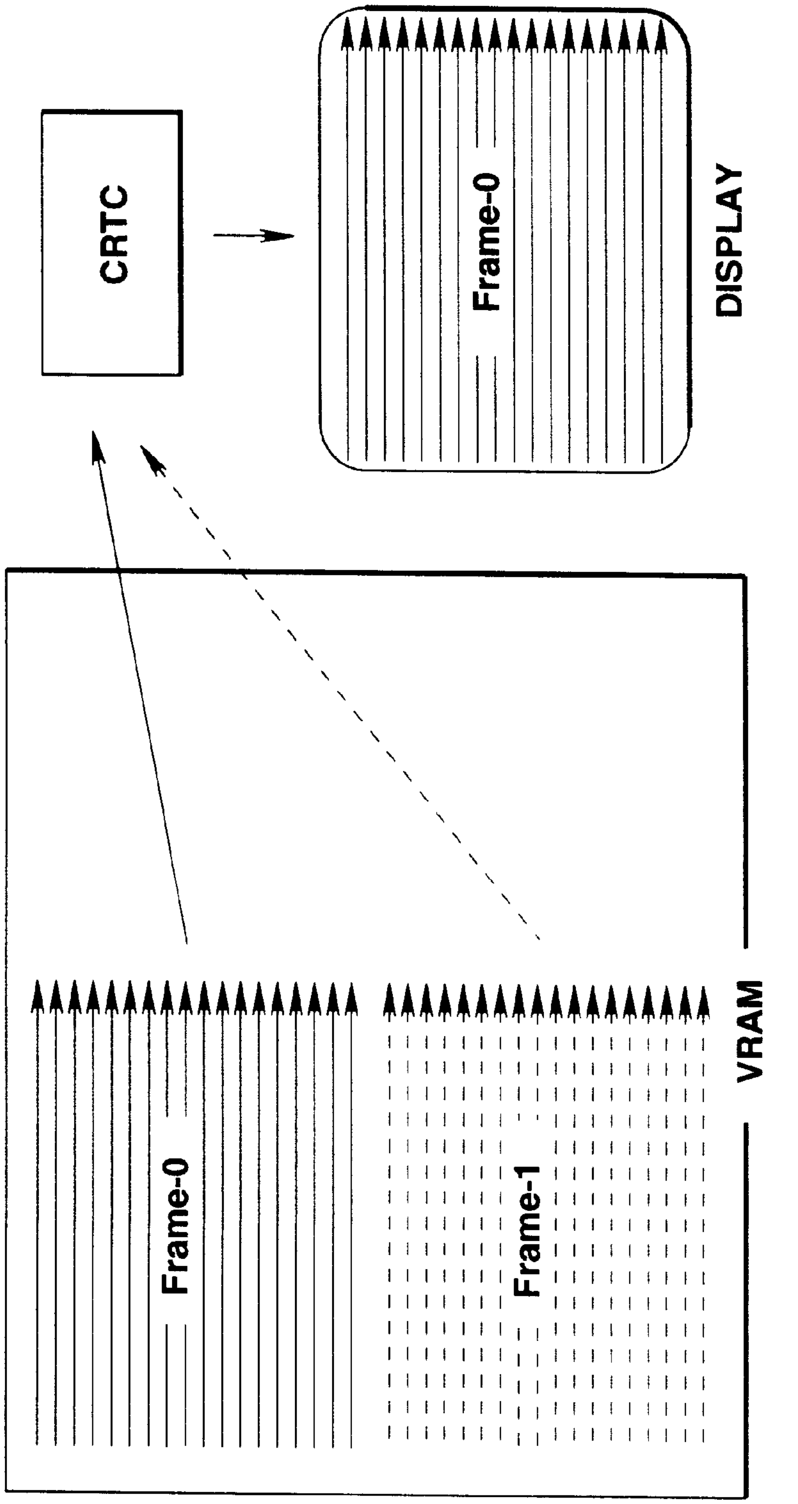
FIG. 2 illustrates typical representation on a display of video signals outputted via the CRTC.

Referring to the drawings, preferred embodiments of the present invention will be explained in detail.

Figure 3:
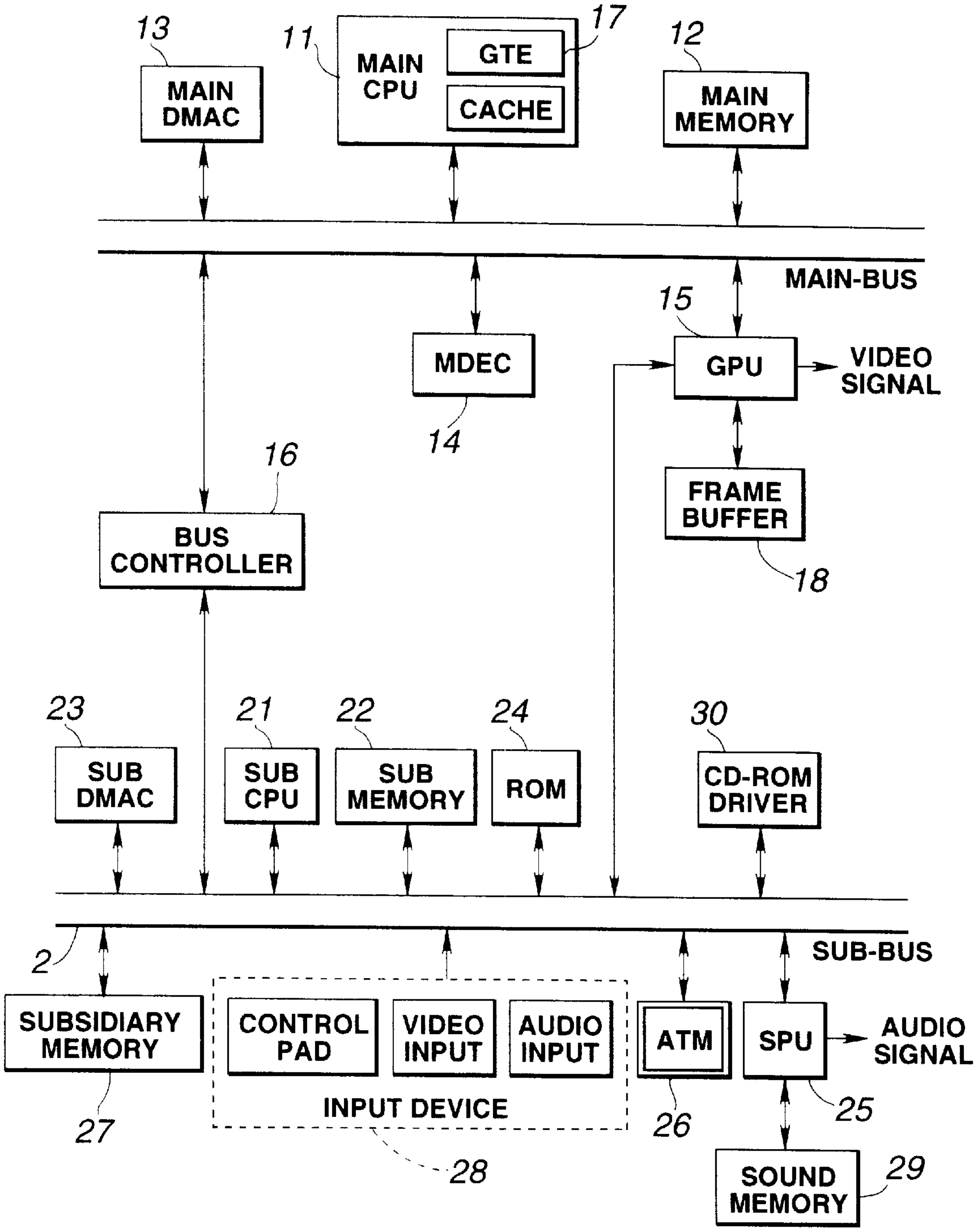
FIG. 3 illustrates a schematic structure of a video game machine employing the present invention.

The present invention is applied to a video game machine configured as shown in FIG. 3.

This video game machine is designed for reading out and executing a video program stored in, for example, an optical disc, for playing the game responsive to instructions from a user, and is configured as shown in FIG. 3.

That is, the video game machine has two sorts of buses, namely a main bus 1 and a sub-bus 2.

The main bus 1 and the sub-bus 2 are interconnected via a bus controller 16.

To the main bus 1 are connected a main central processing unit (main CPU) 11, comprised of a micro-processor, a main memory 12, comprised of an access memory (RAM), a main direct memory access controller (main DMAC) 13, an MPEG decoder 14 and a picture processing unit or graphic processing unit GPU 15. To the sub-bus 2 are connected a subsidiary central processing unit (sub-CPU) 21, comprised of a random access memory (RAM), a subsidiary direct memory access controller (sub-DMAC) 23, a read-only memory (ROM) 24, having stored therein programs, such as operating systems, a sound processing unit (SPU) 25, a communication controller or asynchronous transmission mode (ATM) 26, a subsidiary memory 27, an input device 28 and a CD-ROM driver 30.

The bus controller 16 is a device on the main bus 1 for executing the switching between the main bus 1 and the sub-bus 2 and is initially in an opened state.

The main CPU 11 is a device operated by a program on the main memory 12. Since the bus controller 16 is initially in the opened state during startup, the main CPU 11 reads out the boot program from the ROM 214 on the sub-bus 2 and executes it to reproduce the application program and necessary data from the CD-ROM by the CD-ROM driver 30 for loading on the main memory 12 and on devices on the sub-bus 2. On the main CPU 11 is loaded a geometry transfer engine (GTE) 17 configured for performing processing, such as coordinate transformation. The GTE 17 has a parallel computing mechanism for parallel execution of plural calculations and executes calculations such as coordinate transformation, light source calculations, matrix or vector calculations at a high speed responsive to requests for calculations from the main CPU 11. The main CPU 11 defines a three-dimensional model as a combination of basic unitary figures (polygons) such as triangles or quadrangles based on the results of calculations by the GTE 17 to prepare instructions for delineation corresponding to respective polygons for delineating a three-dimensional picture. The main CPU 11 also packetizes the instructions for delineation to send the instructions for delineation as a command packet to the GPU 15.

The main DMAC 13 is a device on the main bus 1 for managing DMA transfer of a device on the main bus 1. The main DMAC 15 has a device on the sub-bus 2 as an object when the bus controller 16 is in an opened state.

The GPU 15 is a device on the main bus 1 functioning as a rendering processor. This GPU 15 interprets the instructions for delineation transmitted thereto as a command packet from the DMAC 13 to calculate the Z-value and the colors of all pixels making up the polygon from color data of the apex points and the Z-values specifying the depth. In addition, the GPU 15 performs rendering processing for writing the pixel data on a frame buffer 18 as a picture memory responsive to the Z-values.

The MDEC 14 is an I/O connection device capable of operating parallel to the CPU, and is a device on the main bus 1 functioning as the picture expanding engine. This MDEC 14 decodes picture data encoded after orthogonal transform such as discrete cosine transform.

The sub-CPU 21 is a device on the sub-bus 2 operating by a program on the sub-memory 22.

The sub-DMAC 23 is a device on the sub-bus 2 for managing DMA transfer for the device on the sub-memory 22. This sub-DMAC 23 acquires rights for the bus only when the bus controller 16 is closed.

The SPU 25 is a device on the sub-bus 2 functioning as a sound processor. This SPU 25 reads out and outputs sound source data from the sound memory 29 responsive to the sound command sent as a command packet from the sub-CPU 21 or the sub-DMAC 23.

The ATM 26 is a device for communications on the sub-bus 2.

The subsidiary memory 27 is a data input/output device on the sub-bus 2 and is made up of a non-volatile memory, such as a flash memory. This subsidiary memory 27 transiently stores data such as a game process or scores.

The input/output device 28 is an input device on the sub-bus 2 from other equipments, such as a control pad, man/machine interface, such as a mouse, picture input or speech input.

In addition, the CD-ROM driver 30 is a data input device on the sub-bus 2, and reproduces necessary data or application programs from the CD-ROM.

That is, with the present video game machine, the geometric processing system, performing geometric processing, such as coordinate transformation, clipping or light source calculations, defining three-dimensional models as a combination of the unitary figures (polygons), such as triangles or quadrangles, for preparing instructions for delineation for delineating a three-dimensional picture for transmitting the instructions for delineation for respective polygons as a command packet on the main bus 1, is made up of the main CPU 11 on the main bus 1 and the GTE 17, while the rendering processing system for generating pixel data for respective polygons based on the instructions for delineation from the geometric processing system for writing in the frame buffer 18 by way of rendering processing for writing a figure on the frame buffer 18 is made up of the GPU 15.

Figure 4:
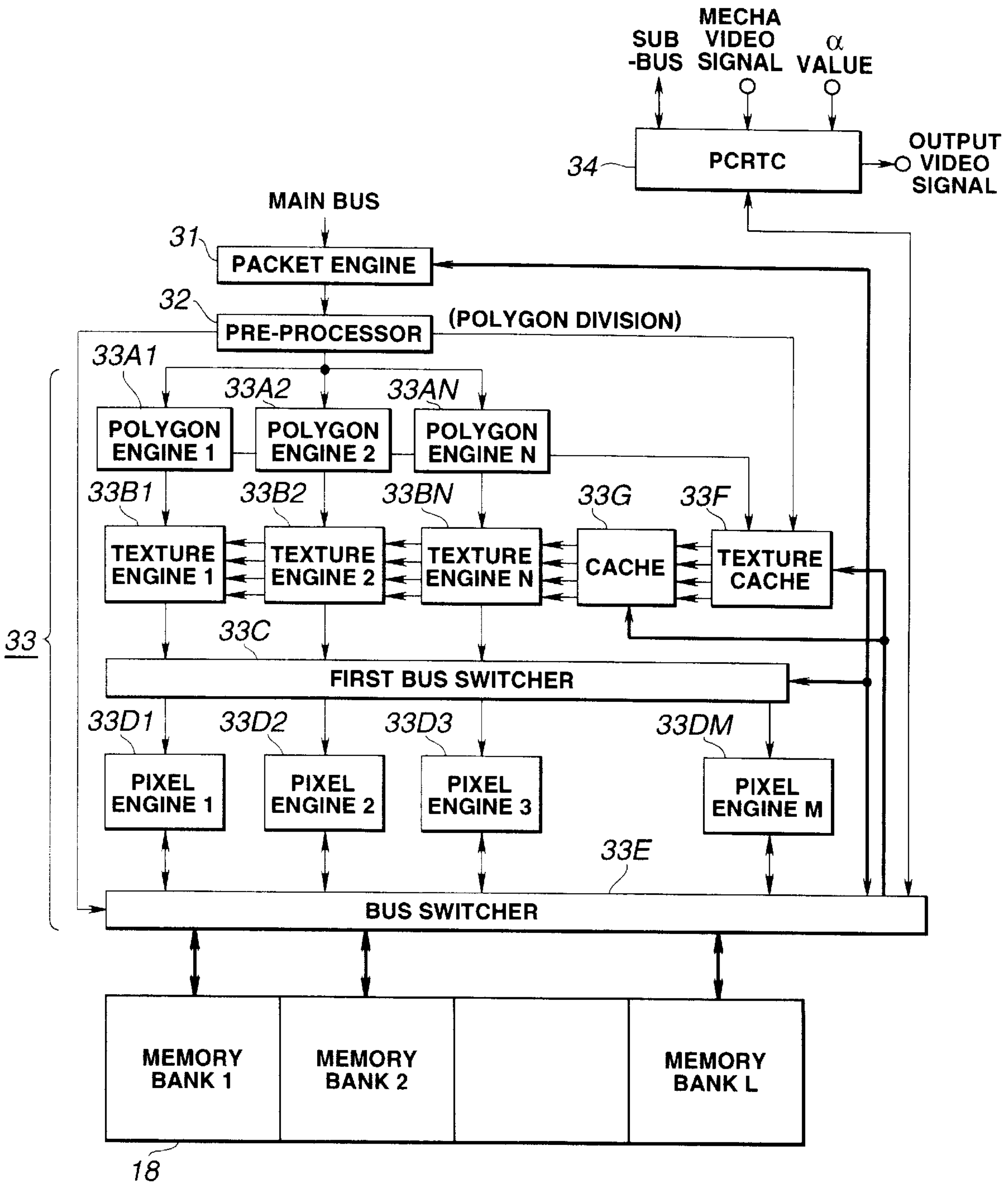
FIG. 4 illustrates typical examples of a texture picture and a target color in the picture displaying method according to the present invention.

The GPU 15 has a packet engine 31 which is connected to the main bus 31 as shown in FIG. 4 showing its basic structure, and performs rendering processing of writing pixel data of the respective pixels in the frame buffer 18 in accordance with the instructions for delineation sent from the main CPU 11 or the main DMAC 13 to the packet engine 31 as a command packet, while reading out the pixel data of a picture delineated on the frame buffer 18 for supplying the pixel data as video signals via a display controller or CRT controller 34 on a television receiver or a monitor receiver, not shown.

The packet engine 31 develops the command packet, sent from the main CPU 11 or main DMAC 13 over the main bus 1 via the packet engine 31 on a register, not shown. The pre-processor 32 also generates polygon data in accordance with the instructions for delineation sent to the packet engine as a command packet and processes the polygon data with pre-set pre-processing such as division of polygons as later explained, while generating various data, such as the information on the coordinates of apex points of each polygon, the address information on the texture or mip map texture or the control information for the pixel interleaving, as required by the delineation engine 33.

In addition, the delineation engine 33 includes N polygon engines 33A1, 33A2, . . . 33AN, connected to the pre-processor 32, N texture engines 33B1, 33B2, . . . 33BN, connected to the polygon engines 33A1, 33A2, . . . 33AN, a sole bus switcher 33C, connected to the texture engines 33B1, 33B2, . . . 33BN, M pixel engines 33D1, 33D2, . . . 33DM, connected to the first bus switcher 33C, a second bus switcher 33E, connected to the pixel engines 33D1, 33D2, . . . 33DM, a texture cache 33F connected to the second bus switcher 33E, and a CLUT cache 33G connected to the texture cache 33F.

In the delineating engine 33, the N polygon engines 33A1, 33A2, . . . 33AN perform polygon-based shading processing, by parallel processing, on polygons sequentially produced responsive to the delineating instructions based on polygon data pre-processed by the pre-processor 32.

The N texture engines 33B1, 33B2, . . . 33BN perform texture mapping or mip mapping by parallel processing on texture data supplied thereto from the texture cache 33F via color lookup table (CLUT) cache 33G for each polygon generated by the polygon engines 33A1, 33A2, . . . 33AN.

It is noted that the address information of the texture or mip map texture bonded to the polygon processed by the N texture engines 33B1, 33B2, . . . 33BN is supplied in advance from the pre-processor 32 to the texture cache 33F, and the texture data as required is transferred from the texture area on the frame buffer 18 based on the above-mentioned address information. To the CLUT cache 33G are supplied CLUT data to be referred to at the time of texture delineation is transmitted from the CLUT area on the frame buffer 18.

The polygon data, processed with texture mapping or mip mapping by the above-mentioned texture engines 33B1, 33B2, . . . 33BN, is transferred via the first bus switcher 33C to the M pixel engines 33D1, 33D2, . . . 33DM.

The M pixel engines 33D1, 33D2, . . . 33DM perform various picture processing operations, such as Z-buffer processing or anti-aliasing, by parallel processing, to generate M pixel data.

The M pixel data, generated by the M pixel engines 33D1, 33D2, . . . 33DM, are written in the frame buffer 18 via second bus switcher 33E.

The second bus switcher 33E is fed with the control information on pixel interleaving from the pre-processor 32. The second bus switcher 33E has the function of selecting L of M pixel data generated by the M pixel engines 33D1, 33D2, . . . 33DM based on the above-mentioned control information for writing M pixel data at a time with the M storage locations in meeting with the shape of the polygon delineated on the frame buffer 18 as accessing units by way of performing the pixel interleaving.

The delineating engine 33 generates all pixel data of each polygon to write the generated pixel data on the frame buffer 18 based on the polygon data pre-processed by the pre-processor 32 in order to write on the frame buffer 18 the picture defined as the combination of polygons by the above-mentioned delineation instructions. The delineating engine 33 also reads out the pixel data of the picture delineated on the frame buffer 18 in order to send the read-out pixel data via a programmable cathode ray tube controller (PCRTC) 34 as video signals to a television receiver or a monitor receiver, not shown.

Figure 5:
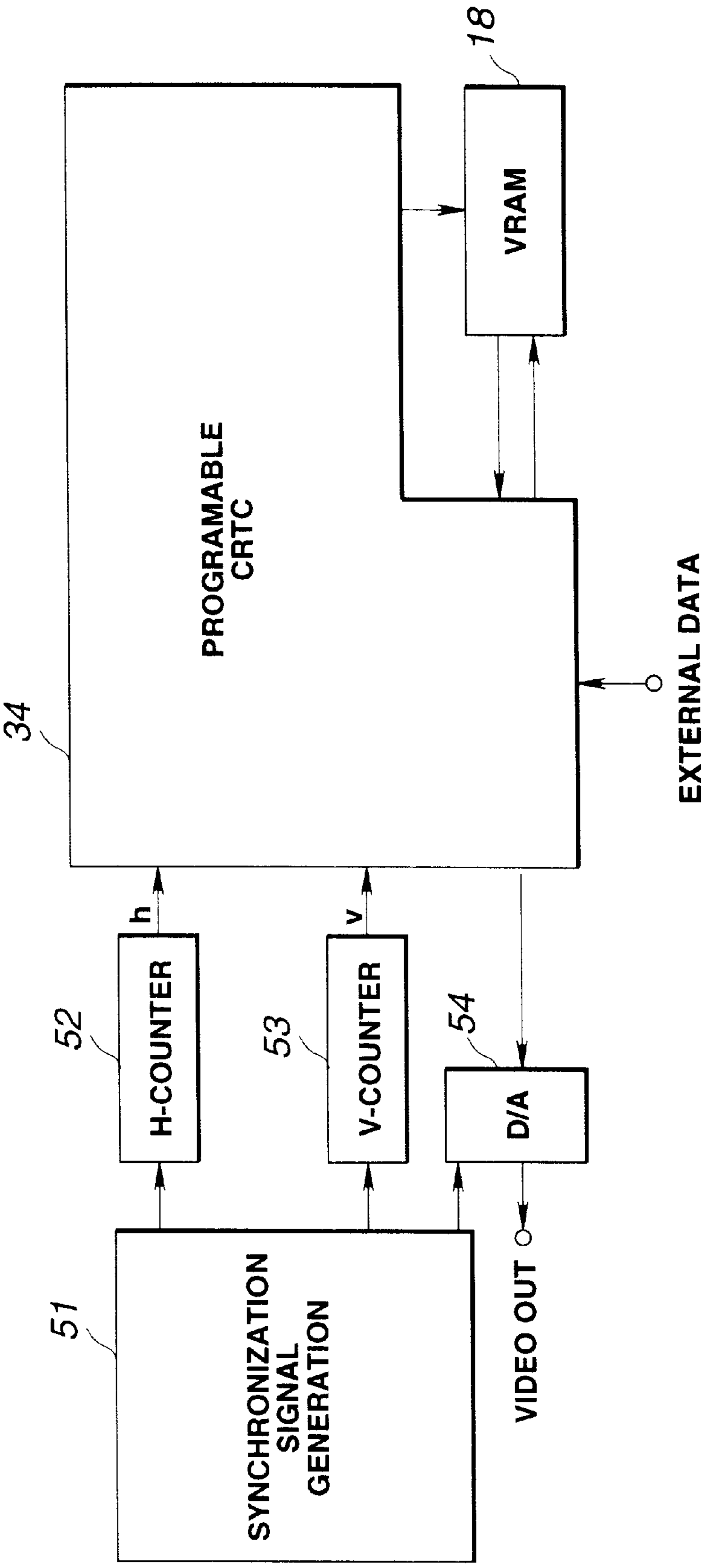
FIG. 5 illustrates a PCRTC employing an address generating apparatus according to the present invention.

The PCRTC 34 reads out picture data written on the frame buffer 18 in accordance with synchronization signals for displaying not only plural pictures on a sole screen but also picture data received from external data That is, the PCRTC 34 generates pre-set addresses from the horizontal synchronization signals and the vertical synchronization signals from the synchronization signal generating circuit 51 based on count values from an H-counter 52 and a V-counter 53 as shown in FIG. 5. The PCRTC 34 reads out picture data from the VRAM 18, based on the above addresses. The picture data are supplied. The PCRTC 34 controls the outputting of the picture data to output video signals via D/A converter 54.

Specifically, the synchronization signal generating circuit 51 generates the horizontal synchronization signals and the vertical synchronization signals and sends the signals to the H-counter 52 and the V-counter 53, respectively.

The H-counter 52 counts the horizontal synchronization signals supplied thereto, while the V-counter 53 is driven based on the count operation of the H-counter 52 to count the vertical synchronization signals supplied thereto.

After the H-counter 52 and the V-counter 53 have counted pre-set numbers to set slicing positions, the PCRTC 34 generates an address associated with a given pixel, frame to frame. Then, after counting a pre-set number for setting the slicing position, the PCRTC 34 generates an address associated with another picture. That is, since one-frame picture data made up of plural pictures have been written in the VRAM 18, an address associated with the respective picture data is generated within one frame period.

The VRAM 18 is configured so that picture data will be sequentially written therein in the frame period. Each time the address is read out from the PCRTC 34, the picture data associated with the supplied address is read out and furnished to the PCRTC 34.

After output-controlling the supplied picture data for causing pre-set pictures to be displayed at pre-set positions on the screen, the PCRTC 34 sends the picture data to the D/A converter 54, which then converts the supplied picture data into analog signals to output video signals.

That is, the PCRTC 34 reads out picture data, corresponding to plural pictures displayed on a sole viewing screen, from the VRAM 18, and output-controls the read-out picture data in order to permit plural pictures with different resolutions to be displayed on a screen.

Meanwhile, the PCRTC 34 can receive picture data from outside to write picture data in the VRAM 18. In addition, the PCRTC 34 can generate addresses for reading out the picture data as other picture data, as will be explained later in detail.

The configuration of the CRTC according to a first embodiment will be explained.

A PCRTC 34*a* according to a first embodiment has plural CRTC buffers, for displaying plural pictures with different resolutions on one screen, and also can independently control the CRTC buffers.

Figure 6:
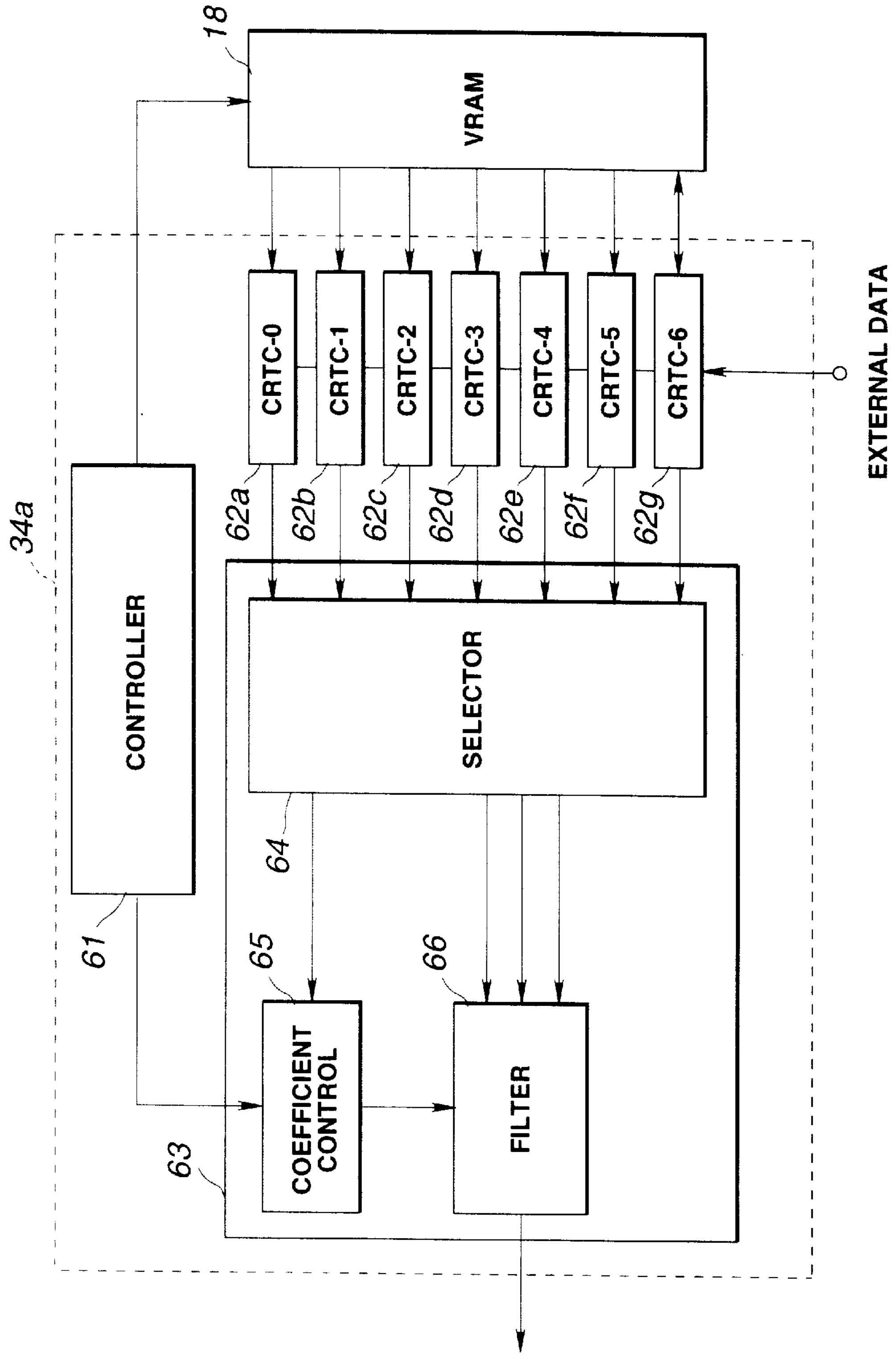
FIG. 6 illustrates the conceptual structure of the CRTC.

Specifically, the PCRTC 34*a* has a controller 61, plural CRTC buffers 62*a* to 62*g* and a selective synthesis unit 63, as shown for example in FIG. 6. In the VRAM 18 are written picture data with different resolutions, as shown in FIG. 7.

Once a pre-set number of the synchronization signals has been counted and the desired slicing position has thereby been set, the controller 61 can lower the resolution if the high-resolution picture data has been seized in the VRAM 18 but the picture data should be displayed on a low-resolution screen. The PCRTC 34*a* generates addresses for slicing a picture of low resolution stored in the VRAM 18 in order to send the address to the VRAM 18. When the next slicing position has been set, the PCRTC 34*a* generates addresses for slicing another picture data of high resolution stored in the VRAM 18.

Figure 7:
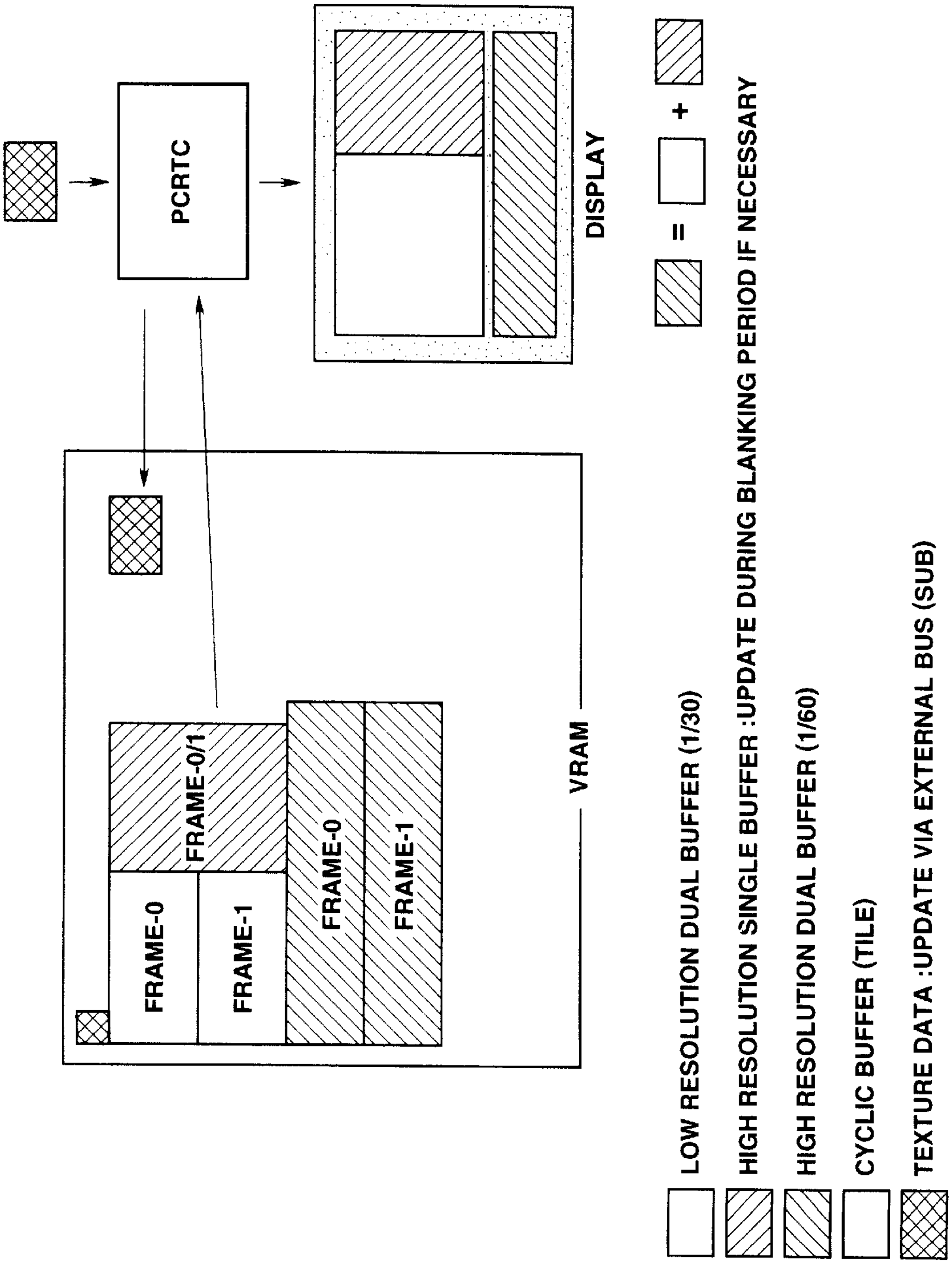
FIG. 7 illustrates typical representation of a display of video signals outputted via PCRTC.

In the VRAM 18 are written picture data of low resolution and picture data of high resolution displayed in one frame, as shown in FIG. 7. Each time an address is furnished from a control unit 61, the picture data corresponding to the address is read out and sent to a CRTC buffer 62. Similarly to the picture data directly written in the VRAM 18, the picture data supplied from outside via a CRTC buffer 62*g* is read out from the VRAM 18 by the address from the controller 61.

The CRTC buffer 62 is constituted by plural CRTC buffers 62*a* to 62*g*, as described above, and is fed with and transiently stores picture data of different resolutions of different pictures in each of the CRTC buffers 62*a* to 62*g*. The CRTC buffers 62*a* to 62*g* are controlled independently by the controller 61 for sequentially selecting and synthesizing the picture data from one horizontal scanning line to another. This permits the PCRTC 34*a* to display pictures of different resolutions from one scanning line to another, as in the case of the display representation shown in FIG. 7.

On the other hand, the CRTC buffer 62*g* of the CRTC buffer 62 has bidirectional functions. That is, the CRTC buffer 62*g* can seize picture data supplied from outside and transmit the seized picture data to the VRAM 18. When fed with an address from the controller 61, the VRAM 18 can read out picture data seized similarly to other picture data. The picture data, thus read out, is supplied via a CRTC 62*g* to the selection synthesis unit 63.

The selection synthesis unit 63 has a selector 64 for selecting supplied picture data, a coefficient control circuit 65, and a filter 66, and respective picture data are supplied via CRTC buffers 62*a* to 62*g* to the selector 64.

The selector 64 selects the supplied picture data, under control by the controller 61, and sends only pre-set picture data to the filter 66.

When fed with pre-set picture data from the selector 64, the coefficient control circuit 65 modifies part of parameters of the picture data, based on the results of calculations by the control unit 61, or multiplies part or all of parameters of the picture data sent to the filter 66 with alpha-values representing opacity of the object.

The filter 66 synthesizes the supplied picture data to output synthesized picture data. The output synthesized picture data are converted by the D/A converter into analog video signals. With the analog video signals, plural pictures can be displayed on a display screen, as shown in FIG. 7.

The configuration of the CRTC of a second embodiment is now explained. In the following description, the same reference numerals as those used in the first embodiment are used to depict similar components.

Figure 8:
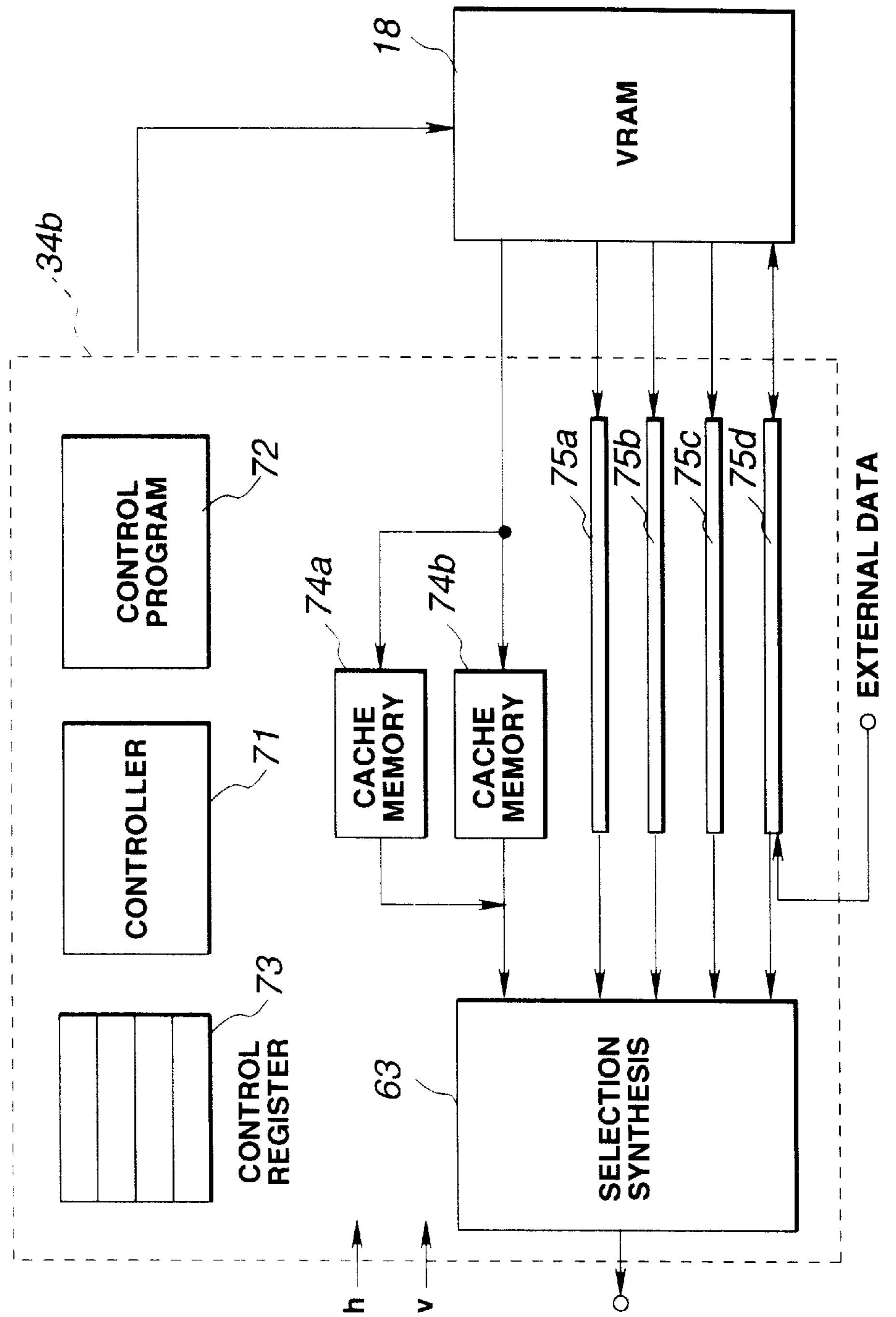
FIG. 8 illustrates a specified structure of the PCRTC.

With a PCRTC 34*b* of the second embodiment, having a line buffer in place of the CRTC buffer as shown in FIG. 8, representation may be made in a similar manner by independently controlling these line buffers. The PCRTC 34*b* includes a controller 71, a control program unit 72, a control register 73, cache memories 74*a*, 74*b*, line buffers 75*a* to 75*b* and a selection synthesis unit 63.

The controller 71 modifies parameters of part of picture data as later explained or executes calculations for alpha-values based on a program stored in the control program 72. The controller 71 generates an address to be supplied to the VRAM 18 via control register 73, while controlling the cache memory 74, line buffer 75 and the selection synthesis unit 63.

The VRAM 18 is responsive to the supplied address to read out-picture data. The read-out picture data is supplied via line buffers 75*a* to 75*d* to the selection synthesis unit 63. The line buffer 75*d* is a bi-directional line buffer and can receive picture data supplied externally to send the picture data to the VRAM 18. The VRAM 18 can write picture data from outside, supplied via line buffer 75*d*, and read out the picture data, based on the address from the controller, as other picture data. The VRAM 18 also sends the picture data to the cache memories 74*a*, 74*b*.

The cache memories 74*a*, 74*b* are each made up of plural memories and can write supplied picture data. The cache memories 74*a*, 74*b* read out picture data, under control by the controller 71, and transmits the picture data to the selection synthesis unit 63.

The selection synthesis unit 63 modifies parameters of part of the supplied picture data or multiplies part or all of the parameters of the picture data with alpha-values representing the opacity of the object. The selection synthesis unit 63 then selects the supplied picture data to synthesize the selected picture data. The synthesized are converted by a D/A converter into analog signals. A plurality of the analog picture data can be displayed in a tiled fashion on the display screen. The PCRTC 34*b* can contribute to reduction in production costs by use of line buffers 75*a* to 75*d* in place of the CRTC buffer.

In addition, since picture data read out from the VRAM 18 is supplied to the PCRTC 34*b* and plural picture data can be independently output-controlled via line buffers 75*a* to 75*d*, plural pictures can be displayed on a sole display screen.

Moreover, with the PCRTC 34*b*, since the external picture data can be received by the bidirectional line buffer 75*d* and written in the VRAM, if a pre-set address is generated by the controller, the received picture data is read out from the VRAM 18 as other picture data. This enables the PCRTC 34*b* not only to display plural pictures on a display screen, but also to receive and display a picture from outside.

Figure 9:
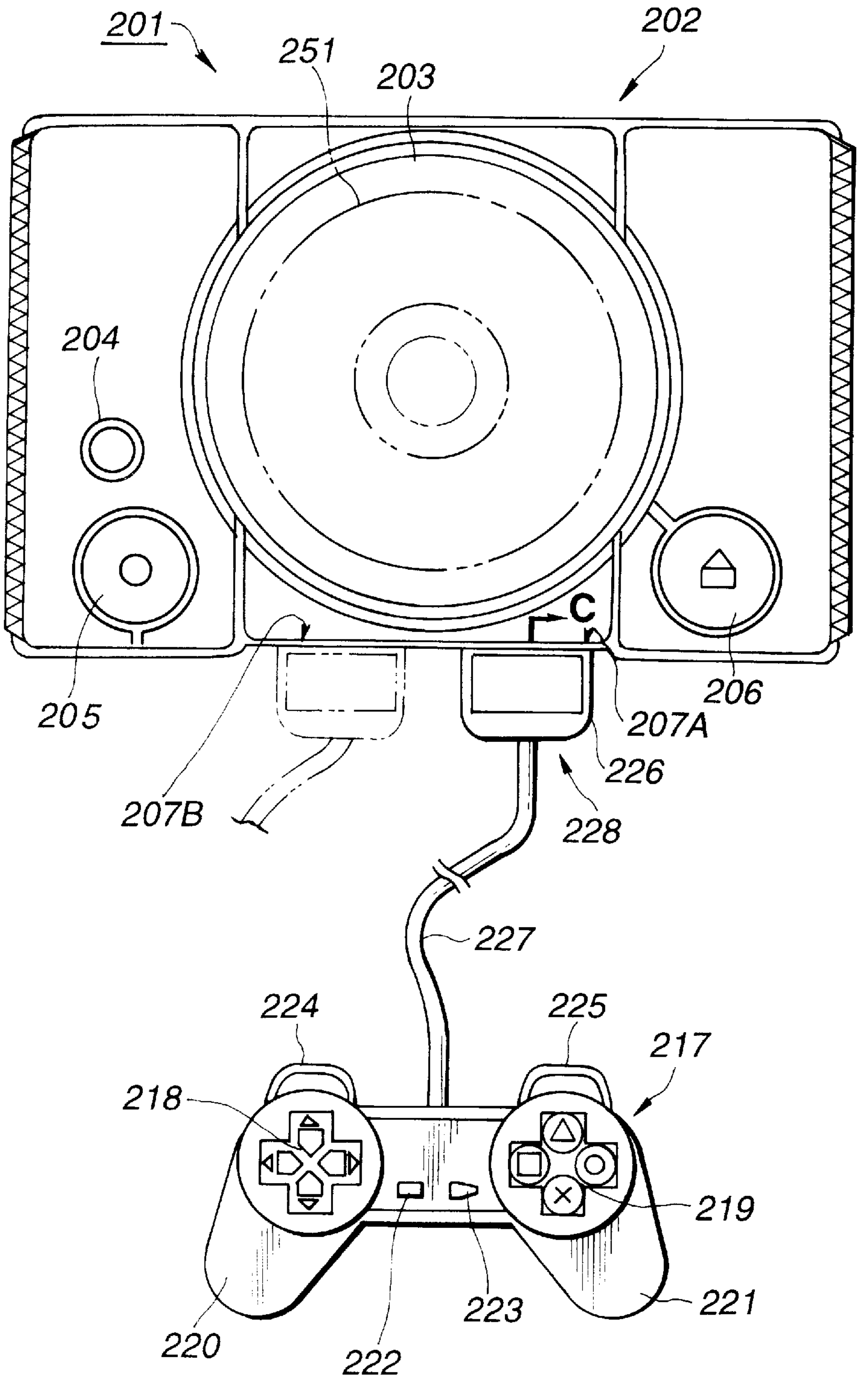
FIG. 9 is a plan view of a video game machine employing the present invention.
Figure 10:
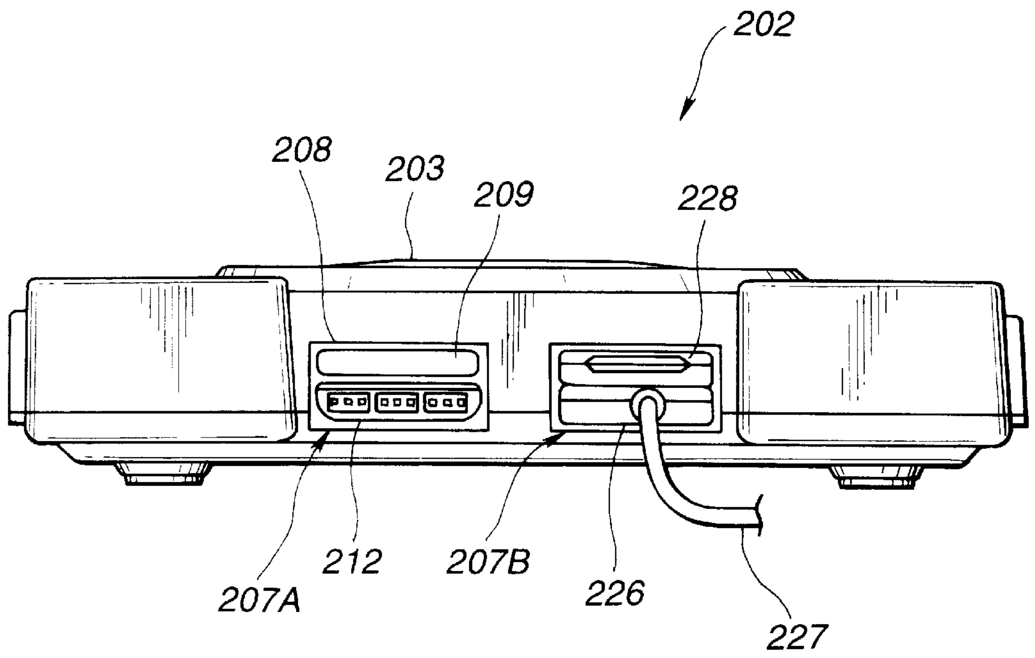
FIG. 10 is a back side view of the video game machine.
Figure 11:
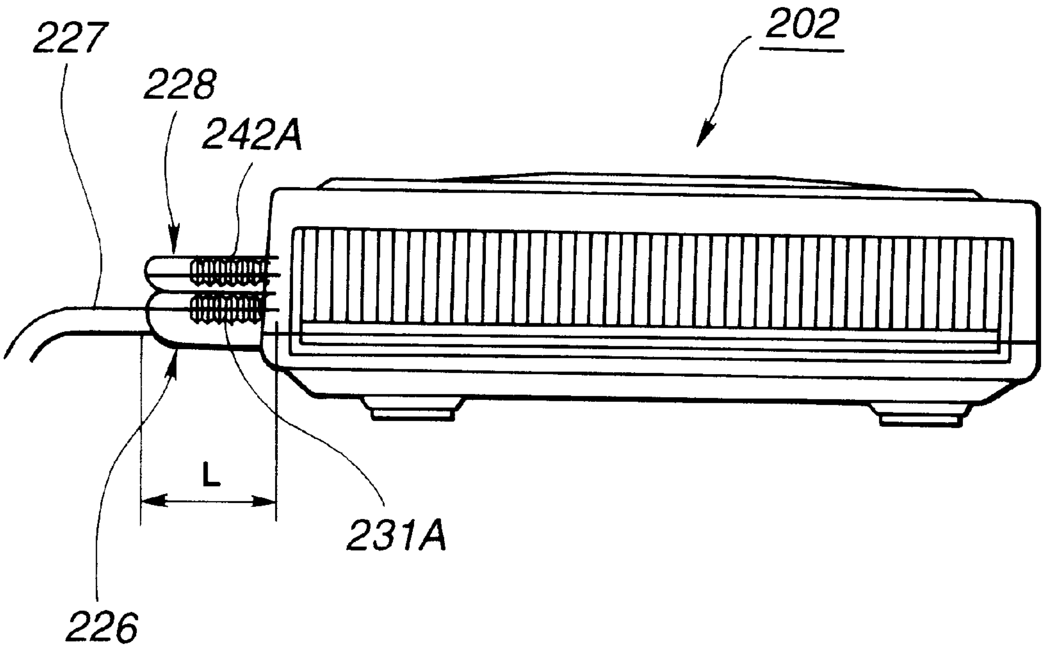
FIG. 11 is a side view of the video game machine.

The video game machine embodying the present invention is configured as shown for example in a plan view of FIG. 9, a front view of FIG. 10 and a side view of FIG. 11.

Figure 12:
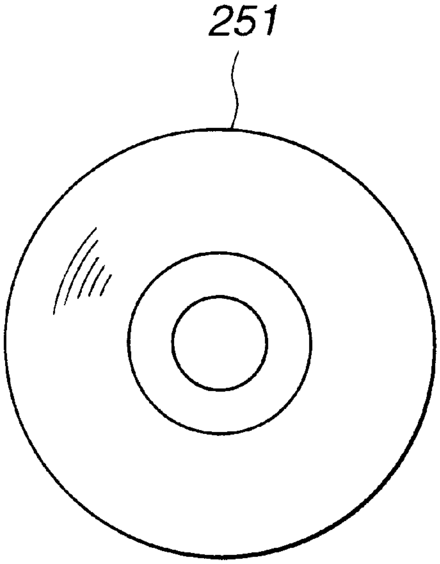
FIG. 12 is a plan view showing a CD-ROM loaded on the video game machine.

That is, a video game machine 201, shown in FIG. 9, is basically made up of a main body portion 202, and an operating unit 217 connected to the main body portion 202 via a cable 227. A disc loading unit 203 is provided at a mid portion of the upper surface of the main body portion 202 and a CD-ROM 251 shown in FIG. 12 is loaded in the inside of the unit 203. On the left side of the disc loading unit 203 are provided a power source switch 205 actuated for turning the power source of the apparatus on or off, and a reset switch 204 for temporarily resetting the game. On the right side of the disc loading unit 203 is provided a disc actuating switch 206 actuated when loading or unloading the CD-ROM 251 to the disc loading unit 203.

On the front side of the main body portion 202 are provided connecting portions 207A, 207B, as shown in FIG. 10. These connecting portions 207A, 207B are provided with a connecting terminal 226 at a foremost part of a cable 227 led out from the terminal inserting portion 217, a connection terminal inserting portion 212 for connection to a recording unit 228 such as a memory card, and a recording inserting unit 208. That is, two actuating units 217 and two recording units 228 can be connected to the main body portion 202.

The front view of FIG. 10 shows the state in which the connection terminal 226 and the recording unit 228 are connected to the right side connection portion 207B, while none of the connection terminal 226 or the recording unit 228 is loaded on the left side connection portion 207A. Referring to FIG. 10, a shutter 209 is provided on the recording inserting unit 208, so that, when the recording unit 228 is loaded on the main body portion 202, the shutter 209 is pushed inwards by the distal end of the recording unit 228 for loading the recording unit 228.

A grip part 231A of the connection terminal 226 and a grip part 242A of the recording unit 228 are processed for anti-slipping, such as by knurling. The length of the connection terminal 226 and that of the recording unit 228 are selected to be substantially of the same value, as shown in a side view of FIG. 11.

The operating unit 27 has supporting portions 220, 221 gripped by left and right hands. The distal ends of the supporting portions 220, 221 are provided with actuating portions 218, 219. The operating portions 224 ,225 can be operated by an index finger of left or right hand, while the operating portions 218, 219 can be operated with a thumb of the left or right hand.

A selection switch 222 actuated when performing a selecting operation during the game and a start switch 223 actuated when starting the game are provided between the actuating portions 218, 219.

With the present video game machine 201, the CD-ROM 251 loaded on the disc loading unit 203 is reproduced by the above-mentioned CD-ROM driver 30. The actuating unit 217 is equivalent to the input device 28, while the recording device 228 is equivalent to the subsidiary memory 27.

With the above-described address generating apparatus, pre-set addresses are generated based on the synchronization signals so that picture data written in the field memory are sequentially read out. The picture data thus read out are sent to plural line buffers in the address generating apparatus. Therefore, the address generating apparatus independently controls the outputs of the respective picture data via each line buffer so that plural pictures can be displayed on one and the same screen.

Also, with the above-described address generating apparatus, at least one of the plural line buffers can receive external picture data for writing on the field memory, so that, when a pre-set address is produced, external picture data received is read out from the field memory, as other picture data. Therefore, the address generating apparatus can read out a picture received from external data in the same way as the picture data written in the picture memory, thus enabling plural pictures to be displayed on the same screen.

With the above-described picture displaying apparatus, pre-set addresses are generated based on the synchronization signals so that picture data written in the field memory are sequentially read out. The picture data thus read out are sent to plural line buffers in the address generating apparatus. Therefore, the picture displaying apparatus independently controls the outputs of the respective picture data via each line buffer to produce video signals so that plural pictures can be displayed on one and the same screen.

Also, with the picture displaying apparatus, at least one of the plural line buffers can receive external picture data for writing on the field memory, so that, when a pre-set address is produced, picture data received from outside is read out from the field memory, as other picture data. Therefore, the picture displaying apparatus can read out a picture received from outside in the same way as the picture data written in the picture memory to output video signals, thus enabling plural pictures to be displayed on the same screen.

With the above-described picture displaying apparatus, since the control means is program-controlled, it becomes possible to display a clear picture by partially modifying parameters of picture data or by making calculations of alpha-values.

Moreover, with the above-described picture displaying apparatus, plural pictures of the same sort can be displayed on the same screen by writing picture signals by the cache memory and by sequentially read-out controlling picture signals written in the cache memory by the controlling means.

What is claimed is:

1. A picture displaying apparatus, comprising:

address generating means for generating addresses for reading out picture signals written in a picture memory based on synchronization signals and for controlling different pixel resolutions of different picture signals;

a plurality of buffers respectively supplied with picture signals read out from said picture memory based on said addresses; and controlling means for independently controlling the picture signals outputted from said buffers so that the picture signals supplied to said buffers will be displayed on a display screen, wherein said picture memory stores a plurality of image data of different pictures with different pixel resolutions in said plurality of buffers in correspondence with images to be displayed on said display screen, and said controlling means controls outputting of the picture signals from said buffers so as to display the corresponding images of said different pictures in different pixel resolutions on said display screen.

2. A picture displaying apparatus as claimed in claim 1, wherein at least one of said buffers receives picture signals supplied externally to route the received picture signals to said picture memory, and said controlling means controls outputting of the picture signals from said buffers so as to display a plurality of the images on said display screen, wherein one of the displayed images corresponds to the picture signals received externally.

3. A picture displaying apparatus as claimed in claim 1, further comprising one or more cache memories fed with picture signals read out from said picture memory, wherein said cache memory stores the supplied picture signals, and said control means carry out sequentially read-out control of the picture signals stored in said cache memory for producing a plurality of pictures of the same sort to be displayed on the same display screen.

4. A picture displaying apparatus as claimed in claim 1, further comprising selecting means for selecting the picture signals to be displayed on said display screen, synthesizing means for synthesizing the picture signals selected by said selecting means, and modifying means for modifying at least a part of the parameters of picture signals outputted from said buffers or selected by said selecting means.

5. A picture displaying apparatus as claimed in claim 1, wherein said synthesizing means is program-controlled based on pre-set calculations by said control means.

6. A picture displaying apparatus as claimed in claim 1, wherein said buffer is made up of a line memory.

7. A method for displaying pictures, the steps of the method comprising:

generating addresses for reading out picture signals written in a picture memory based on synchronization signals and controlling different pixel resolutions of different picture signals;

supplying picture signals read out from the picture memory based on said addresses to a plurality of buffers; and independently controlling the picture signals outputted from said plurality of buffers so that the picture signals supplied to said plurality of said buffers will be displayed on display screen, wherein the picture memory stores a plurality of image data of different pictures with different pixel resolutions in a plurality of buffers in correspondence with images to be displayed on said display screen, and the outputting of the picture signals from said buffers is controlled so as to display the corresponding images of said different pictures in different pixel resolutions on said display screen.

* * * * *